(12) United States Patent
Schmidt

(10) Patent No.: US 7,117,633 B2
(45) Date of Patent: Oct. 10, 2006

(54) FOLIAGE WRAP THERMAL BAG

(76) Inventor: Damon Andrew Schmidt, 12658 96th St. North, Largo, FL (US) 33773

( * ) Notice: Subject to any disclaimer, the term of this patent is extended or adjusted under 35 U.S.C. 154(b) by 146 days.

(21) Appl. No.: 11/001,550

(22) Filed: Dec. 1, 2004

(65) Prior Publication Data

US 2005/0076561 A1    Apr. 14, 2005

Related U.S. Application Data

(63) Continuation-in-part of application No. 10/673,982, filed on Sep. 30, 2003, now abandoned.

(60) Provisional application No. 60/449,337, filed on Feb. 24, 2003.

(51) Int. Cl.
*A01G 13/02* (2006.01)

(52) U.S. Cl. ...................................... 47/23.3

(58) Field of Classification Search ............... 47/20.1, 47/23.3, 23.2, 23.1, 19.2, 32.4
See application file for complete search history.

(56) References Cited

U.S. PATENT DOCUMENTS

| | | | |
|---|---|---|---|
| 64,667 A | 5/1867 | Hatch | |
| 1,446,416 A | * 2/1923 | Curtiss | ..................... 47/23.2 |
| 1,820,040 A | 8/1931 | Zuckerman | |
| 4,646,467 A | 3/1987 | Morrisroe | |
| 4,901,472 A | 2/1990 | Donohue et al. | |
| 5,359,810 A | * 11/1994 | Aul | ............................. 47/84 |
| 5,575,109 A | 11/1996 | Kuntz | |
| 5,590,775 A | * 1/1997 | Moore | ..................... 206/423 |
| 6,088,953 A | 7/2000 | Morgan | |
| 6,698,135 B1 | 3/2004 | Robbins | |
| 2005/0229483 A1 | * 10/2005 | Iwig et al. | ............... 47/58.1 R |
| 2006/0059775 A1 | * 3/2006 | L'Estrange | ................. 47/65.8 |

FOREIGN PATENT DOCUMENTS

JP    10165006 A  *  6/1998

* cited by examiner

*Primary Examiner*—Teri Pham Luu
*Assistant Examiner*—Susan C. Alimenti
(74) *Attorney, Agent, or Firm*—Larson&Larson,PA; Herbert W. Larson

(57) ABSTRACT

A one piece fabric wrap has multiple elongated pockets sewn into an inner surface. A cylindrical rope light or heat tape is positioned within the multiple pockets and hook and loop material is attached to an outer perimeter of the inside surface to provide closure of the fabric wrap around frost challenged plants. A drawstring attached along a bottom edge of the fabric wrap secures the assembled foliage wrap around the base of the plant.

17 Claims, 3 Drawing Sheets

FOLIAGE WRAP THERMAL BAG

RELATED APPLICATIONS

This application is a continuation-in-part from U.S. patent application Ser. No. 10/673,982 filed Sep. 30, 2003, now abandoned which is based on provisional application 60/449,337 filed Feb. 24, 2003.

BACKGROUND OF THE INVENTION

1. Field of the Invention

The present invention relates to protecting outdoor plants from cold temperatures. More specifically, the invention relates to a flexible enclosure used in conjunction with a low wattage heat source to protect delicate foliage from damaging cold temperatures.

2. Description of the Prior Art

As many plant enthusiasts know, protecting outdoor plants from damaging temperatures is crucial to their continued enjoyment. Particularly in warm climates when frost or freeze occurs only a few times per year, many plant enthusiasts cultivate outdoor plants that are not frost hardy. Delicate plants that thrive throughout the majority of the year are susceptible to major frost damage or even death when a cold front moves through. In order to preserve the delicate foliage, plant enthusiasts will go to great lengths to ensure that their plants will not be damaged by the freezing temperatures. When a cold front threatens, many plant enthusiasts gather old blankets, sheets, and tarps to cover their delicate plants. These makeshift plant covers are often secured by clothes pins or bricks in an attempt to adequately cover the plants. Likewise, many plant enthusiasts employ Christmas lights to provide additional warmth to their blanketed plants. While these traditional methods do enjoy some success, it is time consuming to find covering materials, and one can never be sure that the makeshift coverings will adequately protect the plants. As many delicate plants are quite expensive and their preservation is anything but certain using traditional methods, plant enthusiasts and cultivators of delicate plants have long desired a more certain way to protect their plants. To this end, one type of plant cover using a heat source has been developed as can be seen in U.S. Pat. No. 6,698,135. However, there still exists a need for an improved, simple, hassle free way to adequately protect delicate plant foliage from damaging temperatures.

SUMMARY OF THE INVENTION

The present invention provides a solution to a long felt need by providing a simple, hassle free way to adequately protect delicate plant foliage from damaging temperatures. A flexible, one piece plant foliage wrap protects plants by providing both shelter from damaging temperatures and additional warmth from a low wattage heat source. The inside of the foliage wrap contains elongated pockets with a low wattage heat source such as cylindrical rope light or KAPTON® heater tape fed through the elongated pockets. A hook and loop material is attached to an outer perimeter of the foliage wrap which, when engaged, secures the foliage wrap around the foliage of a plant. A drawstring is attached to a bottom edge of the foliage wrap which, when tightened, secures the foliage wrap around a base of a plant.

BRIEF DESCRIPTION OF THE DRAWINGS

This invention can be best understood by those having ordinary skill in the art by reference to the following detailed description, when considered in conjunction with the accompanying drawings in which.

DETAILED DESCRIPTION OF THE INVENTION

Figure 1:
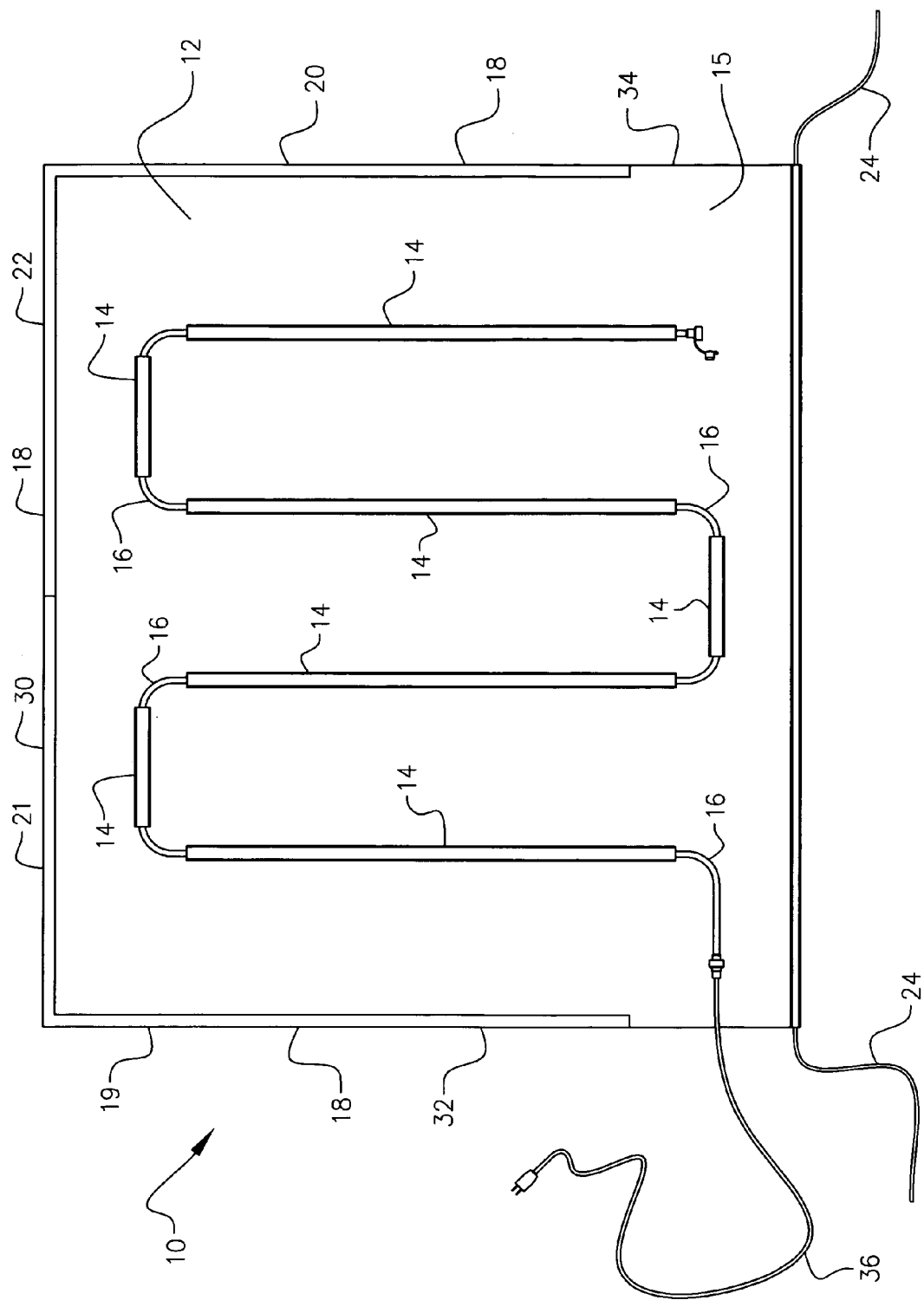
FIG. 1 is a bottom plan view of the foliage wrap of this invention prior to use over foliage.
Figure 2:
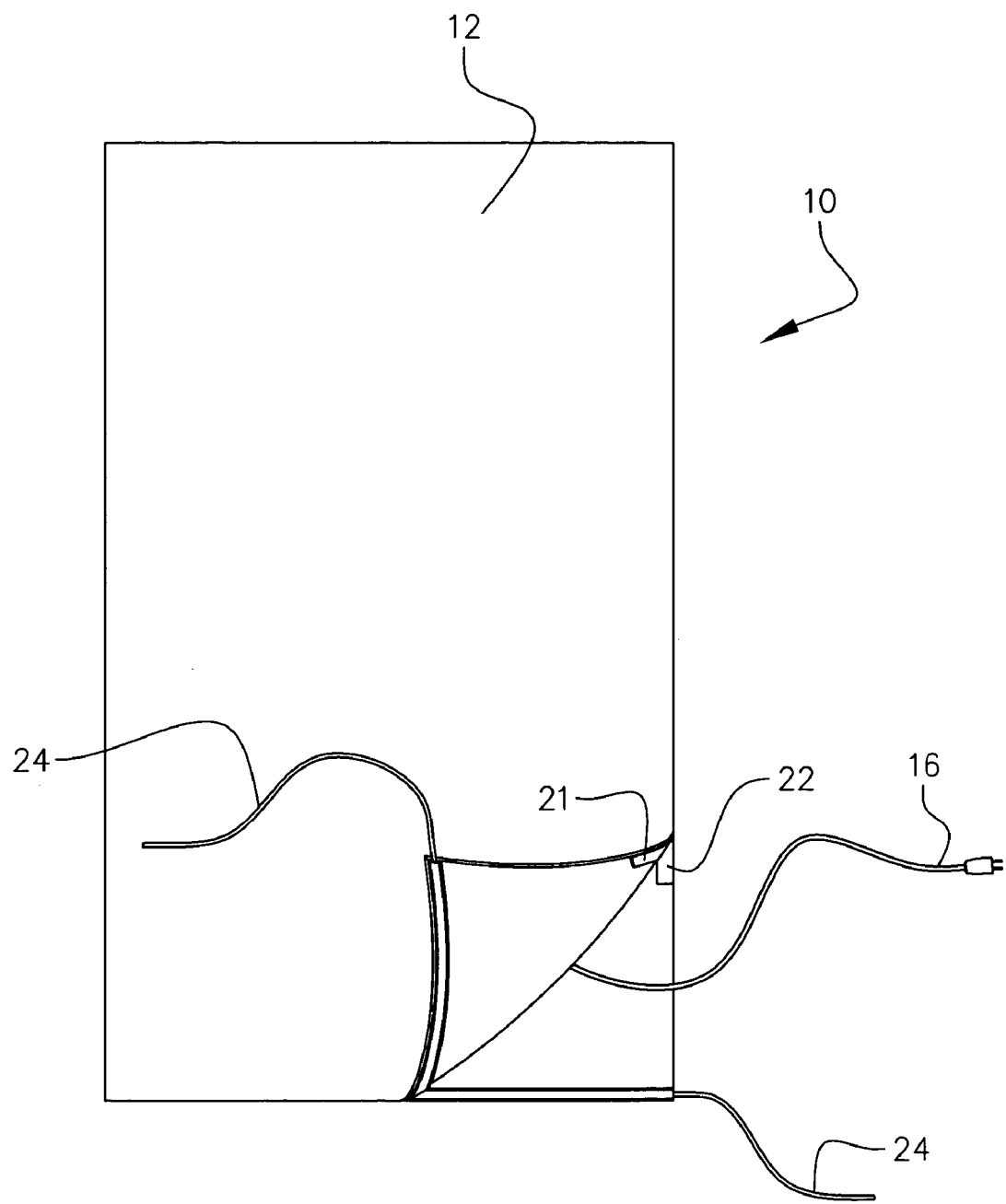
FIG. 2 is an elevational view of the foliage wrap of FIG. 1 attached together on its edges.
Figure 3:
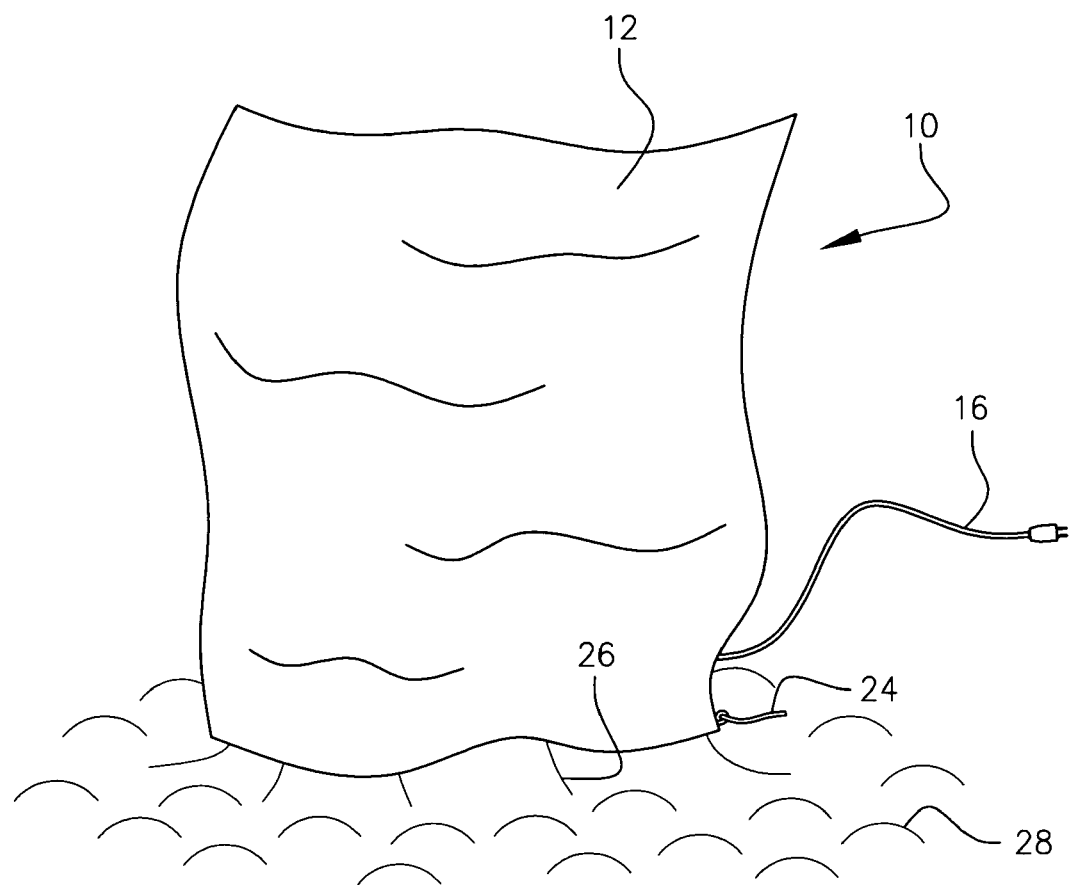
FIG. 3 is an elevational view of the foliage wrap around a plant.

Throughout the following detailed description, the same reference numerals refer to the same elements in all the figures.

Referring to FIG. 1, the foliage wrap 10 has a flexible, one piece fabric 12 in a square or rectangular shape. Generally, the fabric 12 will be about six feet by six feet, but the size of the fabric will vary depending on the area to be covered. The fabric may be made of cotton or synthetic fibers and is ideally machine washable. Multiple elongated, open ended pockets 14 are mounted, usually by sewing, to an inner surface 15 of the fabric 12 as shown in FIG. 1. A heating mechanism 16 is fed through the pockets 14. The heating mechanism 16 is a low wattage, inexpensive, and readily available material such as cylindrical rope light or KAPTON® heater tape. The heating mechanism 16 is also low voltage and is powered by a 12V battery or by 120V prime power. The heating mechanism 16 is adaptable to allow a plurality of foliage wraps 10 to be cascaded on one common extension cord 36.

Hook and loop material 18 is attached to the fabric 12 along a top perimeter 30 and along two side perimeters 32 and 34. The hook and loop material 18 is attached in opposing positions such that hook 19 and loop 20 attach two fabric 12 sides together and hook 21 and loop 22 attach a top portion of the fabric 12 together. A drawstring 24 is attached to a bottom perimeter of the fabric 12 such that the drawstring 24 is adapted to secure the fabric 12 around the base of the plant 26.

The foliage wrap 10 may be used to protect tropical or subtropical plants, either planted in earth soil 28 or outdoor potted plants. The plant foliage that may be protected includes roses, petunias, impatiens, marigolds, and like low growing plants. Larger plants such as palm trees may also be protected, whether planted or potted, depending on the size of the foliage wrap 10.

Equivalent elements can be substituted for the elements set forth above to create substantially the same function in substantially the same way with substantially the same results.

Having thus described the invention, what is claimed and desired to be secured by Letters Patent is:

1. A foliage wrap for protecting outdoor plants from cool temperatures, said foliage wrap comprising:
   a flexible one piece fabric,
   a drawstring attached to an outer perimeter of the fabric, the drawstring adapted to secure the fabric around a base of a plant;
   a hook and loop material attached to a majority of an outer perimeter of the fabric on an inside surface, the hook and loop material adapted to form the fabric around a foliage of the plant;

multiple elongated pockets having an opening at each end mounted to an inner surface of the fabric; and a low wattage heating mechanism contained within the multiple open ended pockets.

2. The foliage wrap according to claim 1, wherein the heating mechanism is a cylindrical rope light.

3. The foliage wrap according to claim 1, wherein the heating mechanism is a heating tape.

4. The foliage wrap according to claim 1, wherein the heating mechanism is adapted to allow a plurality of plant enclosures to be cascaded on a common extension cord.

5. The foliage wrap according to claim 1, wherein the heating mechanism is powered by 120V prime power.

6. The foliage wrap according to claim 1, wherein the heating mechanism is powered by a 12V battery.

7. The foliage wrap according to claim 1, wherein the fabric wrap is a machine washable material.

8. The foliage wrap according to claim 1, wherein the multiple pockets are attached by sewing.

9. A method of protecting outdoor plants from cool temperatures comprising:

providing a natural or synthetic fiber fabric in a square or rectangular shape;

attaching elongated open ended pockets on an inner surface of the fabric;

threading a heating mechanism through the elongated pockets of the fabric;

attaching a hook and loop material to a majority of an outer perimeter of the fabric inner surface, the hook and loop material being mounted in an opposing position so that the hook and loop will pair to secure the fabric around the foliage of a plant;

attaching a drawstring to an outer perimeter of the fabric, the drawstring adapted to tighten the fabric around the base of the plant wherein an assembled foliage wrap is created;

covering the plant with the assembled foliage wrap, the foliage of the plant being substantially encased by the foliage wrap; and connecting the heating mechanism to an electrical power source.

10. The method according to claim 9, wherein the heating mechanism employed is a cylindrical rope light.

11. The method according to claim 9, wherein the heating mechanism is a heating tape.

12. The method according to claim 9, wherein the heating mechanism is adapted to allow a plurality of foliage wraps to be cascaded on a common extension cord.

13. The method according to claim 9, wherein the heating mechanism is powered by 12V battery.

14. The method according to claim 9, wherein the heating mechanism is powered by 120V prime power.

15. The method according to claim 9, further comprising cleaning the foliage wrap in an automatic washing machine.

16. The method according to claim 9, wherein the plants are subtropical types.

17. The method according to claim 9, wherein the plants are tropical types.

* * * * *